Patented May 15, 1951

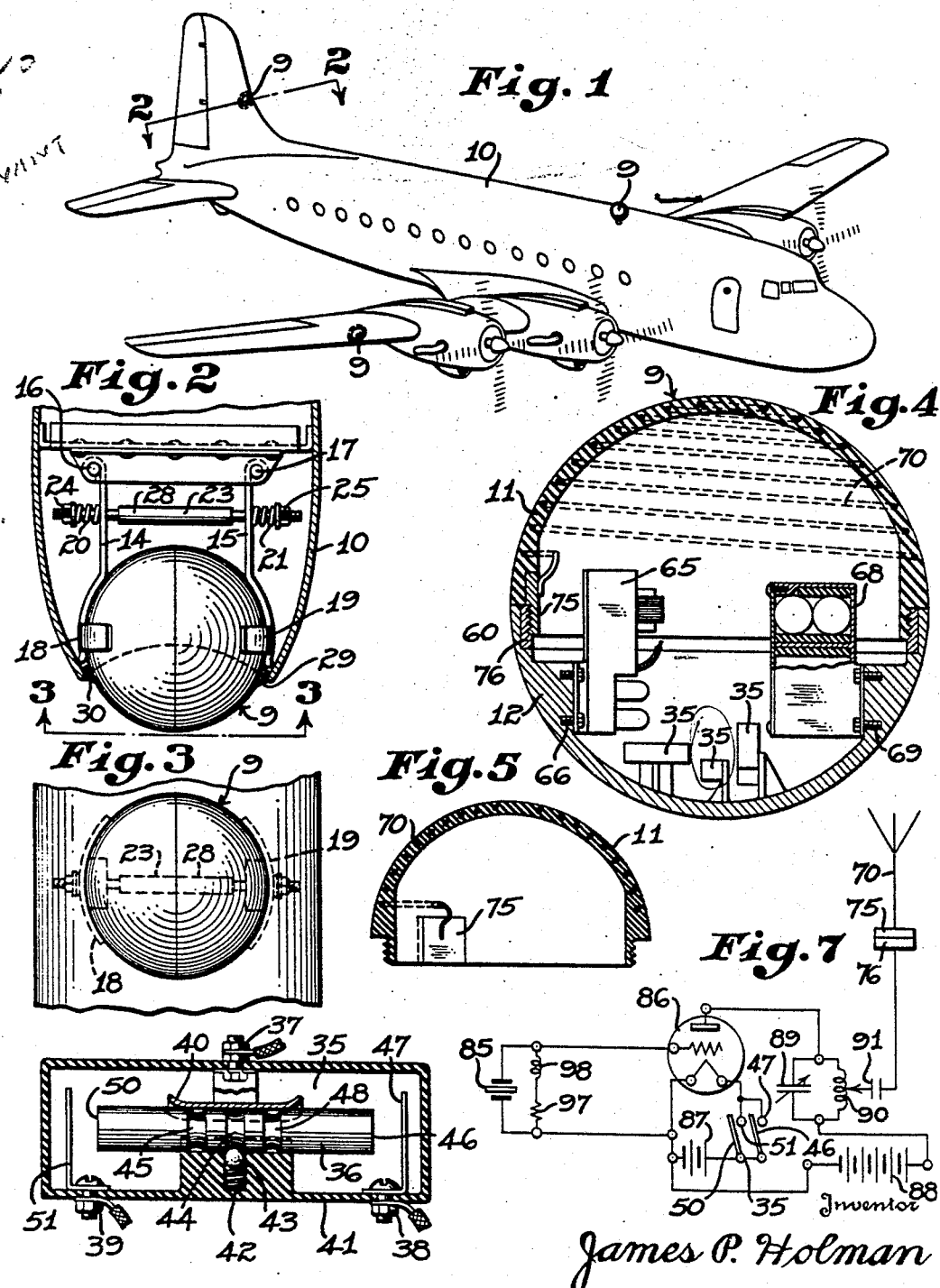

2,552,969

UNITED STATES PATENT OFFICE 2,552,969

TELLTALE RADIO SIGNAL DEVICE

James P. Holman, Pomona, Calif.

Application October 11, 1946, Serial No. 702,609

5 Claims. (Cl. 250—17)

The present invention relates to a method of and apparatus for automatically sending information as to the position of aircraft upon its collision or crack-up.

In aircraft collisions or crack-ups, especially where they occur in mountainous or wooded terrain, it is desirable that the position of the aircraft be located by a searching party within a relatively short time so that first aid may be administered to the surviving aircraft personnel. Heretofore, it has been proposed to convey information as to the position of the damaged aircraft by means of a radio transmitter which is automatically placed in operation upon collision or crack-up. In such proposed arrangements, there is a possibility that the radio transmitter will not become as effective as contemplated, depending upon the particular manner in which the aircraft is damaged or demolished. For example, the aircraft may be damaged in such a manner that the metal fuselage will produce a detrimental shielding or damping effect on the transmitter or in other arrangements wherein balloons are intended to be released, the intended path of the balloons may be blocked by wreckage. It is, therefore, an object of the present invention to provide an improved radio signaling system which automatically becomes operative upon the collision or crack-up of aircraft to indicate its position.

A specific object of the present invention is to provide an improved method and apparatus for automatically transmitting radio signals upon collision or crack-up of aircraft characterized by the manner in which a radio transmitter is assured of being positioned remote from the wreckage where the transmitter may operate efficiently as intended without impairment.

Yet, another specific object of the present invention is to provide an improved method of and apparatus for transmitting information as to the position of aircraft characterized by the manner in which the apparatus may be mounted in strategic positions on the plane to thereby assure the transmission of emergency signals without impairment resulting from shielding or damping produced by the metal aircraft parts.

Still another specific object of the present invention is to provide an improved radio transmitter and housing, characterized by its ruggedness and ease of assembly.

Still another specific object of the present invention is to provide an improved structure on aircraft whereby an emergency transmitter may be attachably and detachably mounted, a characteristic of the structure being that the transmitter is automatically released upon an application of an impact force on the aircraft exceeding a predetermined magnitude.

Yet, a further specific object of the present invention is to provide an improved arrangement of emergency radio transmitters so mounted on aircraft that at least one of the transmitters is rendered fully operative and efficient regardless of the nature and type of collision or crack-up encountered by the aircraft.

Yet, another specific object of the present invention is to provide an improved emergency transmitter having an impact responsive switch associated therewith which is operated regardless of the direction of the impact force.

Still, a further specific object of the present invention is to provide an improved emergency transmitter and housing therefore of relatively small dimensions characterized in the novel manner in which the transmitter antenna is disposed with relationship to the other metallic arrangements of the transmitter.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a perspective view of an aircraft embodying the present invention.

Figure 2 is a sectional view taken substantially on line 2—2 of Figure 1.

Figure 3 is a view in elevation taken in the direction indicated by the line 3—3 in Figure 2.

Figure 4 is a cross sectional view of the transmitter element shown in Figures 1 and 3.

Figure 5 is a sectional view of a part of the transmitter shown in Figure 4.

Figure 6 is a sectional view through one of the impact responsive switches in the transmitter shown in Figure 4.

Figure 7 shows a schematic circuit diagram of the transmitter within the transmitter proper shown in Figure 4.

An important feature of the present invention is that one and preferably more radio transmitters 9 are strategically located on the aircraft 10 in such a manner that upon crack-up or damage to the aircraft at least one transmitter 9 is automatically detached from and thrown clear of the aircraft and rendered operative to transmit a distress signal. The transmitter 9 is within a spherical two part housing 11, 12 which is releasably, attachably and detachably mounted within a pair of cooperating spring biased arms 14, 15, the arms 14, 15 respectively being pivotally mounted on the pins 16, 17 and with their free ends 18, 19 which grip the transmitter 9 biased together by the compression springs 20, 21.

The springs 20, 21 are mounted axially on opposite ends of the rod member 23 which extends transversely of and through the arms 14 and 15 with the compression springs 20 and 21 maintained respectively in contact therewith after initial adjustment of the nuts 24, 25 on the screw threaded ends of the rod member 23 thereby to resiliently urge the arms 14, 15 in engagement with the transmitter housing 11, 12. When the transmitter 9 is not disposed between the arms 14, 15, inward movement of the arms 14, 15 towards one another is limited by their engagement with the central enlarged portion 28 of the rod member 23, in which case such enlarged portion 28 serves as a stop.

It is, therefore, apparent that the spherical transmitter housing 11, 12 containing the transmitter 9 may be inserted into, through suitable openings 29 in the aircraft 10 in a fixed position between arms 14, 15 from where it may be dislodged and thrown clear of the aircraft 10 upon application thereto of impact forces greater than a predetermined amount, the magnitude of such impact forces necessary for dislodgement of the transmitter being determined to a large extent by the force exerted by the compression springs 20, 21.

When the transmitter 9 is held in position as indicated in Figure 2 if desired, a rubber or Neoprene ring 30 may be used to close off the space between transmitter 9 and the outer surface of aircraft 10 to thereby seal the transmitter holding mechanism against the influence of snow, ice, rain and moisture and to lessen the air resistance which otherwise is present. It is noted that the rubber seal 30 is so disposed as to produce comparatively little resistance to the movement of the transmitter 9 when and as it begins to move. Further, if desired, the neoprene seal 30 may be bonded or permanently affixed to the transmitter housing 11, 12.

Not only is the transmitter housing 11, 12 containing the transmitter 9 thrown clear of the aircraft upon which it is normally mounted upon application of impact forces greater than a predetermined amount but also by the means described presently the transmitter 9 which is normally inoperative is simultaneously and automatically made operative to transmit distress signals.

The transmitter 9 is made operative to transmit distress signals upon actuation of the impact responsive switch 35 from its normally open position to a closed position wherein it is effective to maintain the transmitter in an operative condition.

The switch 35 may comprise but one switch or a plurality of switches, each connected in parallel circuit relationship with one another so that upon actuation of only one of such plurality of switches the transmitter circuit is connected to a voltage source thereby to cause the transmitter to become operative to transmit distress signals.

The impact responsive switch 35 of which there may be more than one in the casing 11, 12 oriented in different directions comprises a heavy metallic switch bar 36 arranged upon movement thereof from its normal position in Figure 6 to either close an electrical circuit between terminals 37 and 38 or between terminals 37 and 39. The switch bar 36 is purposely made heavy whereby inertia forces acting on it may move it with respect to its cylindrical seat 40 which is disposed within and on the enclosing casing 41, the casing 41 being stationarily mounted on preferably the bottom half 12 of the two part housing 11, 12.

The switch bar 36 has three positions wherein it is maintained by the spring biased detent means 42. In one of such positions, the normal position shown in Figure 6, the spring biased ball 43 enters the annular groove 44 while in the second position of member 36, the spring biased ball enters the annular groove 45 to thereby maintain the end 46 in engagement with the switch contact 47, and, in the third position of such member 36, the spring biased ball 43 enters the annular groove 48 thereby to maintain the end 50 of member 36 in engagement with the switch contact 51. The switch contacts 47 and 51 are connected respectively to terminals 38 and 39. Thus, upon relative movement of the switch arrangement 36 within and with respect to the insulating casing 41, either the switch 50, 51 is closed or the switch 46, 47 is closed, depending upon the direction of the actuating inertia forces on the heavy metallic switch arrangement 36.

Upon closure of either switch 50, 51 or switch 46, 47, the electrical transmitter circuit is connected to its energized source thereby to render the transmitter operative for the transmission of distress signals. Preferably, more than one of such impact responsive switches 35 is contained in the transmitter housing 11, 12 as indicated in Figure 4 in such a manner that they are each oriented in different directions thereby to assure closure of the energizing circuit of the transmitter regardless of the direction of the impact forces to which the transmitter proper is subjected, either upon immediate crack-up or damage to the aircraft or after the transmitter housing 11, 12 is thrown clear of the aircraft and falls upon the ground.

Also, preferably more than one of such transmitters 9 is releasably, attachably and detachably mounted on the aircraft in the positions indicated in Figure 1 wherein individual transmitters 9 are mounted on a wing, on the tail and on the top surface of the fuselage of an airplane.

Further, preferably the transmitter housing 11, 12 is made spherical as shown so that upon striking the ground, the housing 11, 12 may, under certain circumstances, roll away from the metal parts of the aircraft whereby operating characteristics of the transmitter may be enhanced.

The housing 11, 12 is preferably of two parts maintained together by the screw threaded connection 60 therebetween.

The component parts of the transmitter shown in Figure 4 comprises a chassis 65 upon which is mounted the tubes, coils, condensers, resistances and crystal in the transmitter circuit, the chassis 65 in turn being mounted on the casing half 12 by means of screws 66. If desired, a resilient mounting may be provided for mounting the chassis 65 on the casing half 12.

The switches 35 are mounted on the bottom casing half 12 and the container 68 housing the A and B batteries of the transmitter is mounted on the bottom casing half 12 by means of screws 69. It is apparent that the space allotted to the storage of batteries may be increased to allow more batteries to be stored thereby to provide increased operating time of the transmitter before the batteries run down.

The antenna 70 for the transmitter may be either of the loop type or of the capacity type and in either case, is preferably spaced remote from the other metal parts of the transmitter so that such metal parts impair as little as possible the operating characteristics and efficiency of the antenna 70 in its purpose of radiating distress signals to relatively distant points.

The casing half 11 is thus preferably of insulating material and the antenna 11 may be embedded therein as shown in Figure 4. The antenna 70 is connected to the other components of the transmitter through metallic connecting elements 75, 76, respectively, on casing halves 11, 12, which connecting elements are automatically brought into engagement upon screwing the two casing halves 11, 12 together. It is apparent that in the event that the antenna 70 is of the loop type, two pairs of such contact elements 75 and 76 are necessary to connect the corresponding two ends of the loop antenna to the other component parts of the transmitter proper.

The transmitter 9 may be of various types and may either be automatically modulated or it may, upon energization send out only an unmodulated wave of predetermined frequency determined by the frequency of the oscillation of the crystal 85.

The oscillator shown in Figure 7 comprises batteries 88 through either switch 50, 51 or switch 46, 47. The tuned circuit 89, 90 is connected between the anode of device 86 and the positive terminal of the battery supply 88, a tap on the coil 90 being connected to the antenna 70 through coupling condenser 91 and the switch contacts 75, 76. In conventional manner, the control grid device 86 is connected to one terminal of its cathode through the parallel circuit having in one leg thereof the crystal 85 and in another leg thereof, the serially connected resistance 97 and inductance 98.

It is apparent that the transmitter shown in Figure 7 may take other forms and the present invention is not limited to the precise transmitter shown and described.

It is anticipated, of course, that the distress signals emitted from the transmitting apparatus will be received by a receiver mounted on search aircraft or on commercial aircraft flying over designated lanes.

Although I have shown a mechanical inertia actuated switch for setting into operation the transmitter, it is apparent that other types of switches may be utilized. For example, a mercury switch may be utilized in which upon application thereto of inertia forces greater than a predetermined amount, mercury is caused to flow between electrical contacts wherein it is retained to maintain a closed electrical circuit by a trap structure.

Further, the mechanical switch upon for initiating and maintaining operation of the transmitter may comprise a normally closed switch which is held in open position during the normal flight of an aircraft by a frangible wire which is broken upon the application to the aircraft of force greater than a predetermined amount thereby, to allow the switch to close and initiate operation of the connected transmitter.

It is evident that the component parts of the transmitter in Figure 4 may be mounted differently than that exemplified in Figure 4. For example, the component parts of the transmitter may be fastened in suitable form-fitting pockets in the casing half 12 and if desired, resilient means such as rubber padding may be interposed between the component parts of the transmitter and the transmitter half 12.

Further, while I have shown the switch bar 50 as being circular, in cross-sectional shape, it is apparent that the bar 50 may have other cross-sectional shapes and may, for example, have a square cross-section, in which case the seat structure 40 would have plane cooperating contact surfaces.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. The combination, in apparatus for automatically sending information as to the position of aircraft upon collisions or crack-up, a radio transmitter, a housing for said transmitter, said housing having at least two parts of insulating material, one of said parts having mounted thereon an antenna and the other one of said parts having mounted thereon in spaced relationship from said antenna the other metallic parts of the transmitter.

2. The combination, in apparatus for automatically sending information as to the position of aircraft upon its collison or crack-up, a radio transmitter, a spherical two part housing for said transmitter, said two parts being of insulating material, the transmitter antenna being mounted on one of said parts and the remaining elements of the transmitter being mounted on the other one of said two parts in spaced relationship to said antenna, and metallic means at the junction of said two parts for connecting electrically said antenna to said remaining elements.

3. The combination, in apparatus for automatically sending information as to the position of aircraft upon collision or crack-up, a radio transmitter, a housing for said transmitter, means arranged to releasably mount said housing on an outer surface of said aircraft thereby to assure complete separation of said housing from said aircraft upon application thereto of an impact force greater than a predetermined magnitude, said housing being spherical so that it may roll away from said aircraft upon such complete separation.

4. The combination, in apparatus for automatically sending information as to the position of aircraft upon collisions or crack-up, a radio transmitter, a housing for said transmitter, means arranged to releasably mount said housing on an outer surface of said aircraft thereby to assure complete separation of said housing from said aircraft upon application thereto of an impact force greater than a predetermined magnitude, said housing being spherical and of two parts, the transmitter antenna being mounted on one of said parts and the remaining parts of the transmitter being mounted on the other part in spaced relationship from the antenna.

5. The combination, in apparatus for automatically sending information as to the position of aircraft upon collision or crack-up, a radio transmitter, a housing for said transmitter, means arranged to releasably mount said housing on an outer surface of said aircraft thereby to assure complete separation of said housing from said aircraft upon application thereto of an impact force greater than a predetermined magnitude, said housing being spherical and of two parts, said two parts being of insulating material, the transmitter antenna being mounted on one of said parts and the remaining elements of the transmitter being mounted on the other one of said two parts in spaced relationship to said antenna, and metallic means at the junction of said two parts for connecting electrically said antenna to said remaining elements.

JAMES P. HOLMAN.

REFERENCES CITED

The following references are of record in the file of this patent:

UNITED STATES PATENTS

| Number | Name | Date |
| --- | --- | --- |
| 1,352,000 | Halvaty | Sept. 7, 1920 |
| 1,780,369 | Snow, Jr. | Nov. 4, 1930 |
| 1,836,495 | Paulson | Dec. 15, 1931 |
| 1,860,327 | Kuhn | May 24, 1932 |
| 2,125,969 | Turner | Aug. 9, 1938 |
| 2,138,959 | Cutting | Dec. 6, 1938 |
| 2,149,808 | Ellis | Mar. 7, 1939 |
| 2,160,974 | Lueck | June 6, 1939 |
| 2,242,201 | Woods | May 13, 1941 |
| 2,310,017 | Cannon et al. | Feb. 2, 1943 |
| 2,323,064 | Lustfield | June 29, 1943 |
| 2,328,208 | Friedman | Aug. 31, 1943 |
| 2,357,417 | Marple | Sept. 5, 1944 |
| 2,380,587 | Fenton | July 31, 1945 |
| 2,450,413 | Benioff | Oct. 5, 1948 |
| 2,470,783 | Mead | Mar. 24, 1949 |
| 2,473,050 | Camp | June 14, 1949 |